United States Patent [19]

Asakura et al.

[11] Patent Number: 5,720,409
[45] Date of Patent: Feb. 24, 1998

[54] STRING-ATTACHED CAP

[75] Inventors: Eiichi Asakura; Misako Gomi, both of Tokyo; Osamu Hokari, Kanagawa, all of Japan

[73] Assignees: Calsonic Corporation; Isuzu Motors Limited, both of Tokyo, Japan

[21] Appl. No.: 670,227

[22] Filed: Jun. 21, 1996

[30] Foreign Application Priority Data

Jun. 21, 1995 [JP] Japan .................. 7-154201

[51] Int. Cl.$^6$ .................................. B65D 55/16
[52] U.S. Cl. .................. 220/375; 220/DIG. 33; 296/97.22
[58] Field of Search .............. 220/375, DIG. 33; 215/306; 296/97.22

[56] References Cited

U.S. PATENT DOCUMENTS

| | | | |
|---|---|---|---|
| 1,937,674 | 12/1933 | Teason | 220/375 X |
| 2,599,472 | 6/1952 | Miller | 220/375 X |
| 4,320,853 | 3/1982 | Moore | 220/375 |
| 4,750,190 | 6/1988 | Mizusawa | 220/375 |
| 5,462,190 | 10/1995 | Lienhart et al. | 220/375 |

FOREIGN PATENT DOCUMENTS

| | | |
|---|---|---|
| 62-173321 | 7/1987 | Japan . |
| 3295723 | 12/1991 | Japan . |

*Primary Examiner*—Stephen Cronin
*Attorney, Agent, or Firm*—Sughrue, Mion, Zinn, Macpeak & Seas, PLLC

[57] ABSTRACT

A string-attached cap is formed by connecting one end of a belt-shaped coupling member to a cap. In the string-attached cap, the coupling member is made of flexible resin, and has a ring as its part at one end, and the ring has an engaging part which is the inner periphery of the ring, the engaging part being slidably engaged with an annular groove formed in the outer periphery of the cap.

10 Claims, 4 Drawing Sheets

STRING-ATTACHED CAP

BACKGROUND OF THE INVENTION

1. Field of the Invention

This invention relates to a cap coupled to one end of a belt-shaped coupling member (hereinafter referred to as "a string-attached cap", when applicable).

2. Description of the Prior Art

When an automobile is fueled, a cap of a fuel tank is liable to be lost. In order to eliminate this loss, the cap is, in general, connected to the fuel tank through a belt-shaped coupling member. A string-attached cap of this type is disclosed for instance by Japanese Patent Publication No. Hei. 3- 295723 and Sho. 62-173321.

FIG. 10 shows the string-attached cap which is disclosed by Japanese Patent Publication No. Hei. 3-295723. The string-attached cap 15 includes knob 15a, and one end of a coupling member 13 is connected to knob 15a with a fixing screw 11.

In the above-described conventional cap, the coupling member 13 is connected to the knob 15a of the cap 15. Hence, the cap 15 suffers from a difficulty that the coupling member 13 obstructs the operation of turning the cap 15.

Furthermore, in order to connect the coupling member 13 to the cap 15, the fixing member 11 is employed, which increases the number of components and the number of assembling steps.

SUMMARY OF THE INVENTION

An object of the invention is to provide a string-attached cap which is free from the difficulty that the coupling member obstructs the operation of turning the cap, and which is less in the number of assembling steps than the conventional one.

There is provided a string-attached cap according to the present invention comprising: a cap; a belt-shaped coupling member made of flexible resin; a ring formed integrally with one end of the coupling member; and engaging means formed in the inner periphery of the ring integrally, the engaging means slidably engaging with an annular groove formed in the outer periphery of the cap.

The ring may have a V-shaped section and the engaging means comprises the inner periphery of the V-shaped section.

The engaging means may comprise a plurality of protrusions which are extended radially inwardly from the ring and arranged at predetermined angular intervals.

The ring may include an annular protrusion which is protruded near the annular groove formed in the outer periphery of the cap.

With the string-attached cap of the invention, as the cap is inserted into the ring of the coupling member, the engaging part as the engaging means, which is the inner periphery of the ring, is elastically deformed. When, under this condition, the cap is further inserted into the ring until the latter reaches the annular groove of the cap, the engaging part is restored, thus being engaged with the annular groove.

In the case where the ring has a V-shaped section, as the cap is inserted into the ring, the engaging part, the inner periphery of the ring, is elastically increased in diameter.

In the case where the ring includes a plurality of protrusions which are extended radially inwardly from the ring at predetermined angular intervals, those protrusions are elastically deformed in a direction in which the cap is inserted into the ring.

In the case where the ring includes the annular protrusion which is extended along the outer periphery of the cap, near the annular groove in the outer periphery of the cap when a force acts on the cap and the coupling member, the annular protrusion abuts against the outer periphery of the cap, thus relieving the force; that is, the force acting on the engaging portion is decreased.

As a result, the elastic deformation of the engaging portion which is due to the aforementioned force is decreased, which prevents the engaging portion from coming off the annular groove.

Furthermore, the aforementioned force is dispersed into the annular protrusion and the engaging portion, which allows the cap to smoothly turn.

DETAILED DESCRIPTION OF THE PREFERRED EMBODIMENTS

The invention will be described with reference to its preferred embodiments shown in the accompanying drawings.

Figure 1:
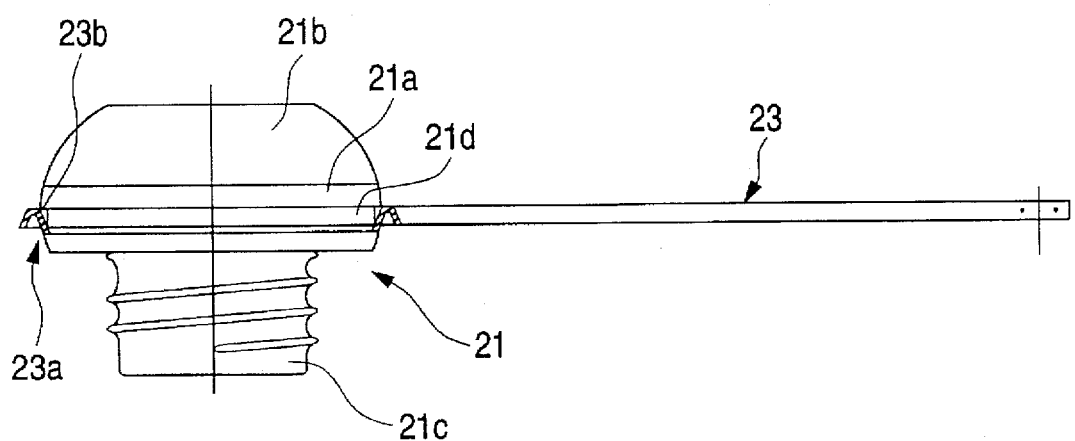
FIG. 1 is a side view of a string-attached cap according to a first embodiment of the invention.
Figure 2:
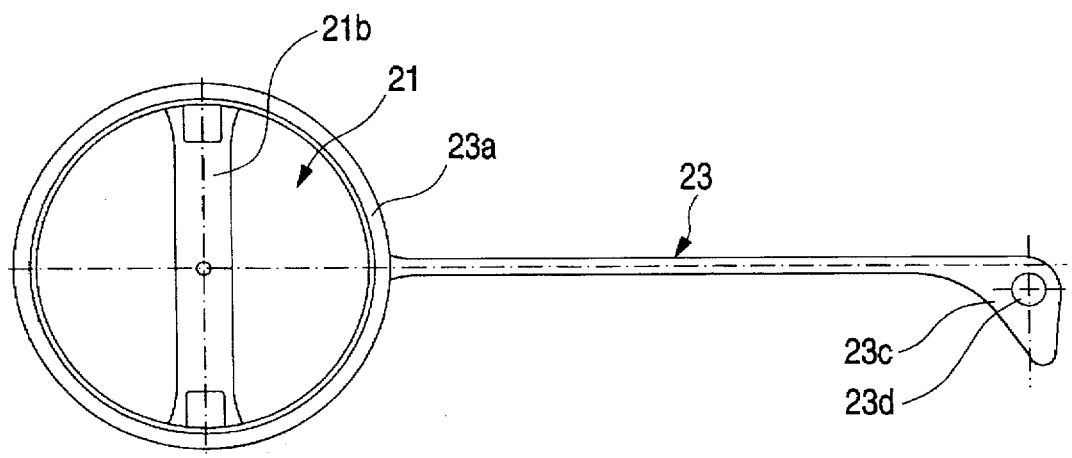
FIG. 2 is a top view of the strip-attached cap shown in FIG. 1.

FIGS. 1 and 2 shows a first embodiment of the invention. In FIGS. 1 and 2, reference numeral 21 designates the string-attached cap according to the invention which is engaged with a fuel tank of an automobile.

The cap 21 is made of resin, and it has a knob 21b on its one side, and a threaded part 21c on the other side.

Further in FIGS. 1 and 2, in the outer periphery of a cap body 21a, an annular groove 21d is formed.

Further in FIGS. 1 and 2, reference numeral 23 designates a belt-shaped (elongated) coupling member which is made of flexible resin such as nylon 66 or the like.

The coupling member 23 has an circular ring 23a at one end. It should be noted that the coupling member 23 and the ring 23a form one unit; that is, the latter 23a is a part of the coupling member 23.

Figure 3:
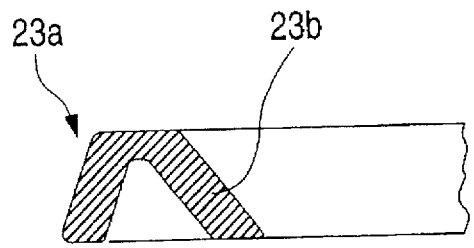
FIG. 3 is a cross-sectional view of a ring in the string-attached cap shown in FIG. 1.

The ring 23a has an inverted-V-shaped section as shown in FIG. 3, and its inner periphery is employed as an engaging portion 23b.

The engaging part 23b is slidably engaged with (fitted in) the annular groove 21d which has been formed in the outer periphery of the cap-body 21a as described above.

The other end part of the coupling member 23 is formed into a triangular mounting part 23c, in which a mounting hole 23d is formed.

The above-described string-attached cap is assembled as follows: The cap body 21a is fitted to the ring 23a of the coupling member 23. In this operation, the engaging part 23b which is the inner periphery of the ring 23a, is elastically deformed, increasing in diameter. As, under this condition, the cap body 21a is further inserted into the ring 23a until the latter 23a reaches the annular groove 21d, the engaging portion 23b is restored to its former state, so that the ring is engaged with the annular groove 21d. Thus, the string-attached cap has been assembled.

Figure 4:
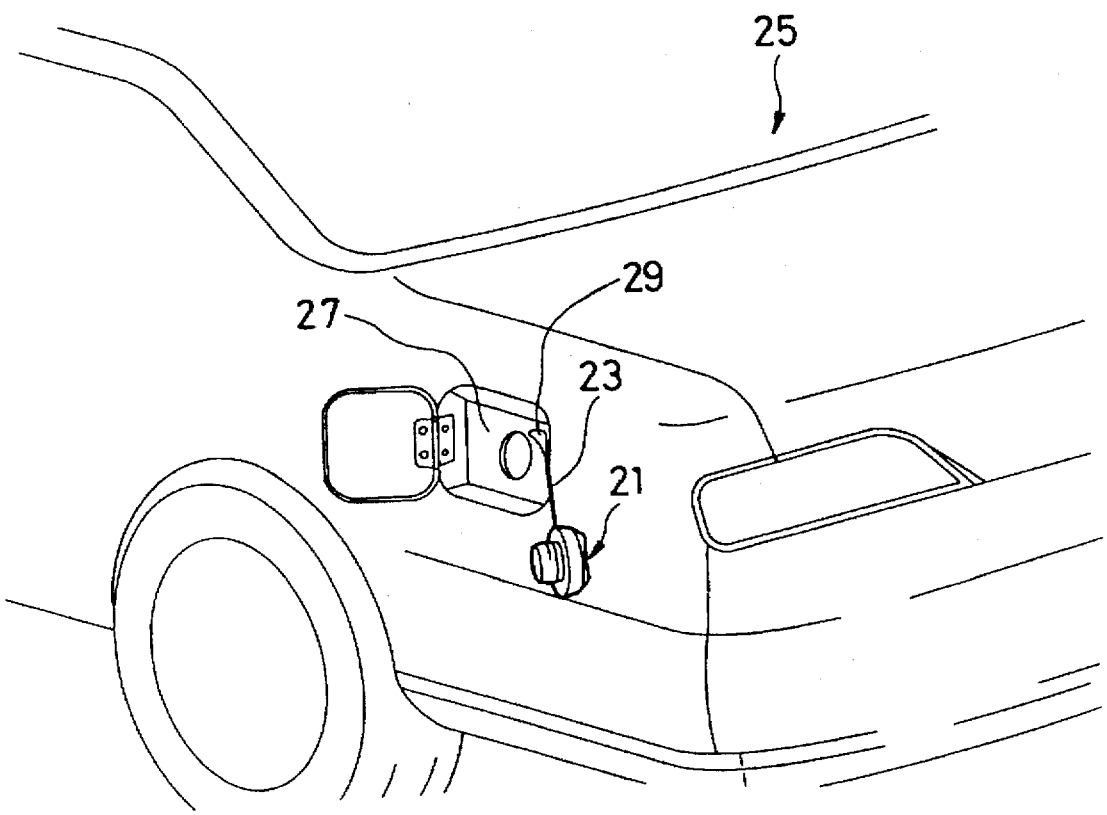
FIG. 4 is a perspective view showing the string-attached cap which is connected to the fuel tank of an automobile.

The string-attached cap thus assembled is connected to the fuel tank of the automobile, for instance, as shown in FIG. 4. That is, the mounting part 23c of the coupling member 23, which is formed at the other end (outer end) of the coupling member, is swingably connected to the fuel tank 27 of the automobile with a pin 29.

In the string-attached cap thus formed, the ring 23a of the coupling member 23 is engaged with the annular groove 21d formed in the cap body 21a. This feature provides the following merit: That is, when the cap 21 is turned with the knob held with the fingers, the coupling member 23 will never obstruct the cap turning operation.

On the other hand, when the cap body 21a is fitted to the ring 23a of the coupling member 23, the engaging part 23b which is the inner periphery of the ring 23a is elastically deformed. Hence, as, under this condition, the cap body 21a is inserted into the ring 23a until the latter 23a reaches the annular groove 21d, the engaging portion 23b is restored to its former state, so that the ring is engaged with the annular groove 21d. Hence, the string-attached cap is much smaller in assembly man-hours than the conventional one.

Furthermore, in the string-attached cap of the invention, the ring 23a has a V-shaped section, and its inner periphery is employed as the engaging part 23b. Hence, the elastic deformation of the engaging part 23b is obtained easily and surely.

Figure 5:
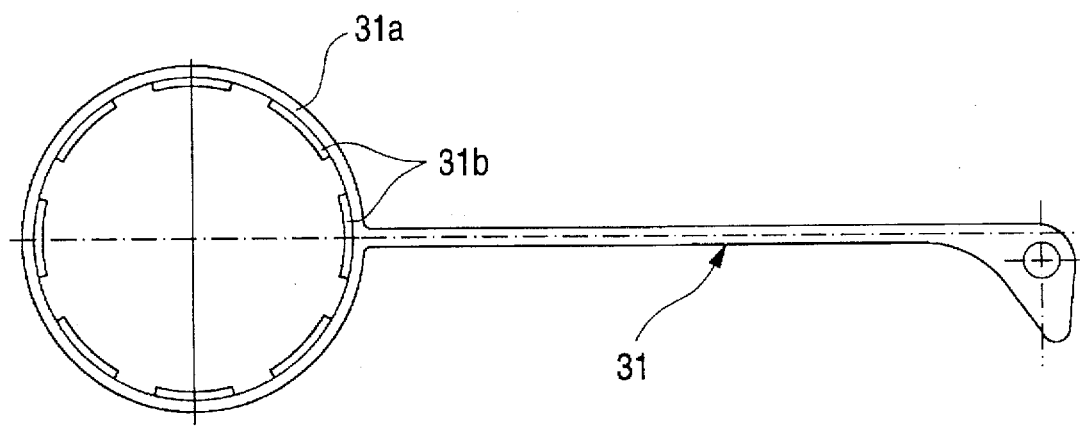
FIG. 5 is a top view showing of the string-attached cap according to a second embodiment of the invention.
Figure 6:
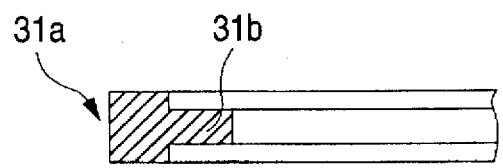
FIG. 6 is a cross-sectional view of a ring shown in FIG. 5.

FIGS. 5 and 6 shows a second embodiment of the invention. In the second embodiment, the coupling member 31 also has a ring 31a at its inner end. The ring 31a has a plurality of protrusions 31b serving as engaging means which are extended radially inwardly from the ring 31a in such a manner that they are arranged at predetermined angular intervals.

When the cap body 21a is inserted into the ring 31a, the protrusions 31b are elastically deformed in the direction in which the cap body is inserted. As, under this condition, the cap body 21 is further inserted into the ring 32a until the latter 32a reaches the annular groove 21d, the protrusions 31b are restored to its former state, thus engaging with the annular groove 21d.

In the second embodiment, the plurality of protrusions 31b, employed as the engaging means, are extended radially inwardly from the ring 31a. Hence, similarly as in the first embodiment, the second embodiment is advantageous in that the elastic deformation of the plurality of protrusions is obtained easily and surely.

Figure 7:
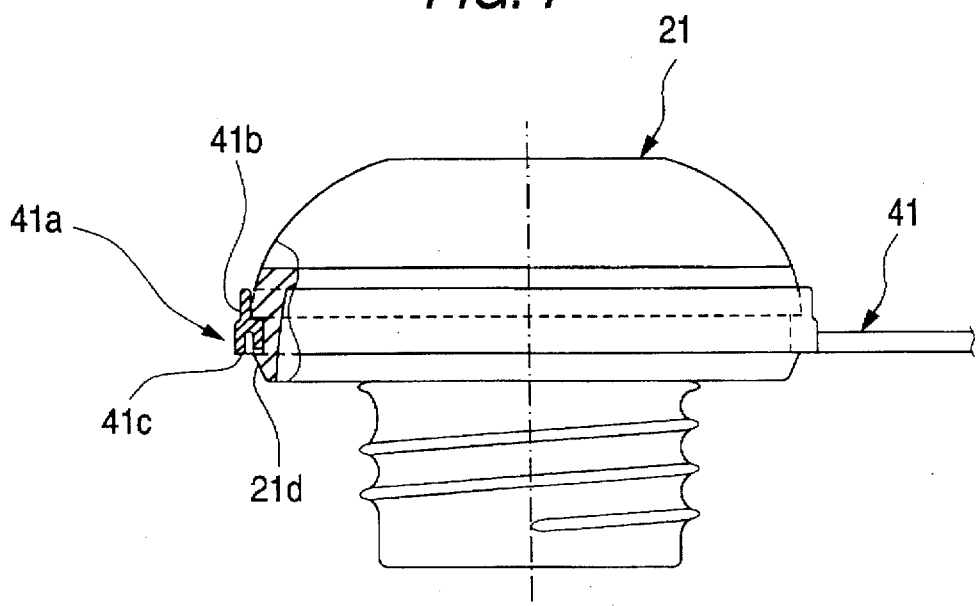
FIG. 7 is a side view of a string-attached cap according to a third embodiment of the invention.
Figure 8:
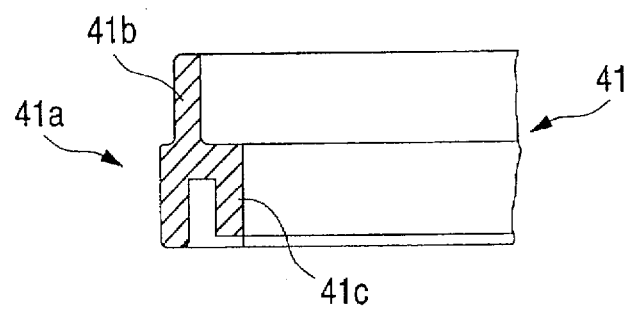
FIG. 8 is a cross-sectional view of a ring shown in FIG. 7.

FIGS. 7 and 8 shows a third embodiment of the invention. In the third embodiment, too, its coupling member 41 has a ring 41a at its one end, and the latter 41a includes an annular protrusion 41b. The annular protrusion 41b is protruded along the outer periphery of the cap near the annular groove 21d of the cap 21.

It should be noted that the annular protrusion 41b is extended in a direction which is opposite to the direction in which an engaging part 41c is extended.

When a force acts on the cap 21 and the coupling member 41, the annular protrusion 41b is pushed against the outer periphery of the cap 21, thus relieving the force; that is, the force acting on the engaging part 41c is decreased.

As a result, the elastic deformation of the engaging portion 41c due to the aforementioned force is decreased, which prevents the engaging part 41c from coming off the annular groove 21d.

The aforementioned force is dispersed into the annular protrusion 41b and the engaging portion 41c, and therefore the cap 21 can be smoothly turned.

Figure 9:
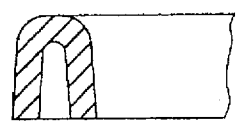
FIG. 9(a) and 9(b) are sectional views showing other embodiments of the ring of the coupling member in the string-attached cap of the invention.
Figure 9:
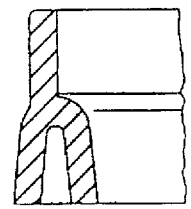
Figure 10:
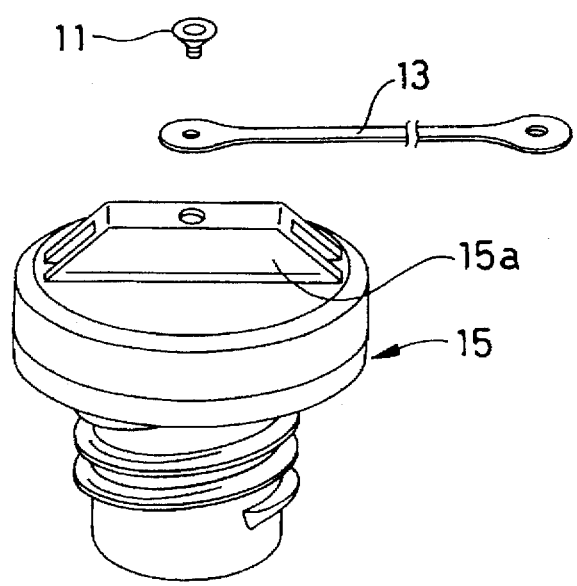
FIG. 10 is an exploded perspective view of a conventional string-attached cap.

In the above-described first embodiment, the ring 23a of the coupling member 23 has a V-shaped section; however, the invention is not limited thereto or thereby. That is, as shown in FIG. 9(a), the ring may have a substantial U-shaped section.

Furthermore, in the above-described third embodiment, the ring 41a of the coupling member 41 has a U-shaped section; however, the invention is not limited thereto or thereby. That is, as shown in FIG. 9(b), the ring may have a substantial U-shaped section.

In the above-described embodiments, the technical concept of the invention is applied to the cap of the fuel tank of an automobile; however, the invention is not limited thereto or thereby. For instance, the technical concept of the invention may be widely applied, for instance, to the cap of a wind-shield washer solution container.

As described above, the ring of the coupling member is inserted into the annular groove formed in the cap. Hence, the coupling member never obstructs the cap turning operation.

When the cap is inserted into the ring of the coupling member, the engaging part which is the inner periphery of the ring is elastically deformed. When, under this condition, the cap is further inserted into the ring until the latter reaches the annular groove of the cap, then the engaging part is restored to its former state, thus being engaged with the annular groove of the cap. Hence, the string-attached cap of the invention is much smaller in manufacturing man-hours than the conventional one.

In the first embodiment of the invention, the ring has a substantially U-shaped section, and its inner periphery is employed as the engaging portion. Hence, the elastic deformation of the engaging portion can be achieved readily and positively.

In the second embodiment of the invention, the ring includes a plurality of protrusions as engaging means which are extended radially inwardly from the ring in such a manner that they are arranged at predetermined angular intervals. Hence, the elastic deformation of the engaging means can be achieved easily and surely.

The third embodiment of the invention has the following effects or merits: When a force acts on the cap and the coupling member, the annular protrusion abuts against the outer periphery of the cap, thus relieving the force; that is, the force acting on the engaging portion is decreased. As a result, the elastic deformation of the engaging part which is due to the aforementioned force is decreased, which prevents the engaging part from coming off the annular groove.

Furthermore, the aforementioned force is dispersed into the annular protrusion and the engaging portion, and the cap can be more smoothly turned.

What is claimed is:

1. A string-attached cap comprising:

a cap having an annular groove formed in an outer periphery thereof;

a belt-shaped coupling member made of flexible resin;

a ring formed integrally with one end of said coupling member; and means, integrally formed in the inner periphery of said ring, for slidably engaging upon insertion with said annular groove formed in the outer periphery of said cap.

2. A string-attached cap as claimed in claim 1, wherein said ring has a V-shaped section and said engaging means comprises the inner periphery of the V-shaped section.

3. A string-attached cap as claimed in claim 2, said ring includes an annular protrusion which is protruded along the outer periphery of said cap near the annular groove formed in the outer periphery of said cap.

4. A string-attached cap as claimed in claim 1, wherein said engaging means comprises a plurality of protrusions which are extended radially inwardly from said ring and arranged at predetermined angular intervals.

5. A string-attached cap as claimed in claim 4, said ring includes an annular protrusion which is protruded along the outer periphery of said cap near the annular groove formed in the outer periphery of said cap.

6. A string-attached cap as claimed in claim 1, said ring includes an annular protrusion which is protruded along the outer periphery of said cap near the annular groove formed in the outer periphery of said cap.

7. A string-attached cap as claimed in claim 1, wherein said ring has a substantial U-shaped section and said engaging means comprises the inner periphery of the substantial U-shaped section.

8. A string-attached cap as claimed in claim 7, said ring includes an annular protrusion which is protruded along the outer periphery of said cap near the annular groove formed in the outer periphery of said cap.

9. A string-attached cap comprising:

a cap having an annular groove formed in an outer periphery thereof;

a belt-shaped coupling member made of flexible resin;

a ring formed integrally with one end of said coupling member; and an engaging mechanism formed in the inner periphery of said ring integrally, said engaging mechanism comprising a U-shaped section slidably engaging with said annular groove formed in the outer periphery of said cap.

10. A string-attached cap comprising:

a cap having an annular groove formed in an outer periphery thereof;

a belt-shaped coupling member made of flexible resin;

a ring formed integrally with one end of said coupling member; and an engaging mechanism formed in the inner periphery of said ring integrally, said engaging mechanism comprising a V-shaped section slidably engaging with said annular groove formed in the outer periphery of said cap.

* * * * *